United States Patent [19]
Gallina

[11] 4,450,122
[45] May 22, 1984

[54] METHOD AND APPARATUS FOR MANUFACTURING FOOT SUPPORTS WITH ANATOMICALLY CONTOURED SHANK PORTIONS

[76] Inventor: Rolando Gallina, Via Monte Pelmo, 3, Montebelluna (Province of Treviso), Italy

[21] Appl. No.: 193,196

[22] Filed: Oct. 2, 1980

[30] Foreign Application Priority Data

Oct. 9, 1979 [IT] Italy ............................. 41620 A/79

[51] Int. Cl.³ ................................................. B29D 27/04
[52] U.S. Cl. ............................... 264/46.4; 249/121; 249/127; 249/160; 249/172; 264/153; 264/223; 264/45.3
[58] Field of Search ............ 264/46.5, 46.4, 45.3, 264/223, 222, 45.1, 46.8, 153; 249/119, 121, 127, 160, 170, 172

[56] References Cited

U.S. PATENT DOCUMENTS

| | | | |
|---|---|---|---|
| 2,877,502 | 3/1959 | Murray | 264/223 |
| 2,955,972 | 10/1960 | Wintermute | 264/46.8 X |
| 3,320,347 | 5/1967 | Greenawalt | 264/223 |
| 3,458,898 | 8/1969 | Casparis | 264/223 X |
| 3,539,145 | 11/1970 | Maxwell | 249/127 X |
| 3,776,504 | 12/1973 | Wiley | 249/127 X |
| 3,896,202 | 7/1975 | Palau | 264/223 X |
| 3,943,215 | 3/1976 | Grüne et al. | 264/46.8 X |
| 4,046,611 | 9/1977 | Sanson | 264/46.8 X |
| 4,069,962 | 1/1978 | Holmquist | 249/119 X |

FOREIGN PATENT DOCUMENTS

| | | | |
|---|---|---|---|
| 2627667 | 12/1977 | Fed. Rep. of Germany | 249/119 |
| 1325454 | 3/1963 | France | 264/223 |
| 381850 | 11/1964 | Switzerland | 249/120 |
| 754299 | 8/1956 | United Kingdom | 264/46.5 |
| 1003033 | 9/1965 | United Kingdom | 264/45.1 |
| 1325622 | 3/1970 | United Kingdom | 264/46.8 |

*Primary Examiner*—Philip E. Anderson
*Attorney, Agent, or Firm*—Guido Modiano; Albert Josif

[57] ABSTRACT

After arranging on dual pans two thick strips of a deformable fiber-reinforced spongeous material and covering them with a liner made of an elastic cloth, a fluid polymer is poured into said pans which reacts to set and foam in a conveniently short time. During the setting time, the user keeps his/her feet fixedly inside the pans, to thus leave an impression which accurately reproduces the shape thereof. After setting, the deformable strips is bonded to the liner and retains the exact impression left by the foot.

Successive trimming operations provide an insole taylored to fit the user's feet.

5 Claims, 8 Drawing Figures

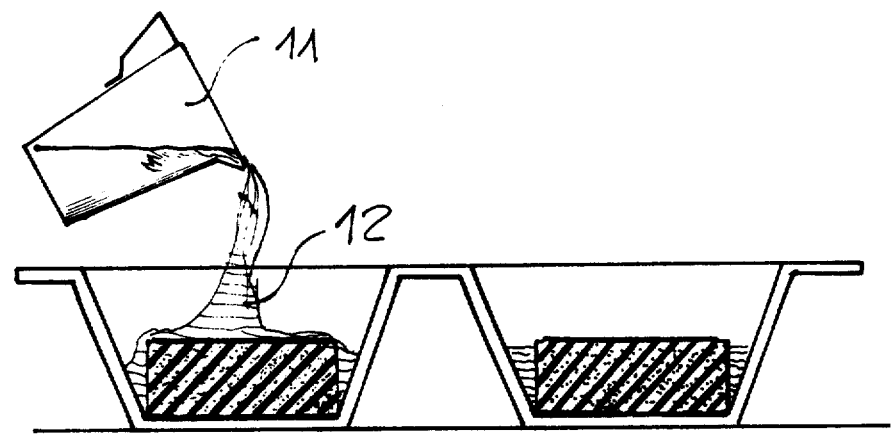
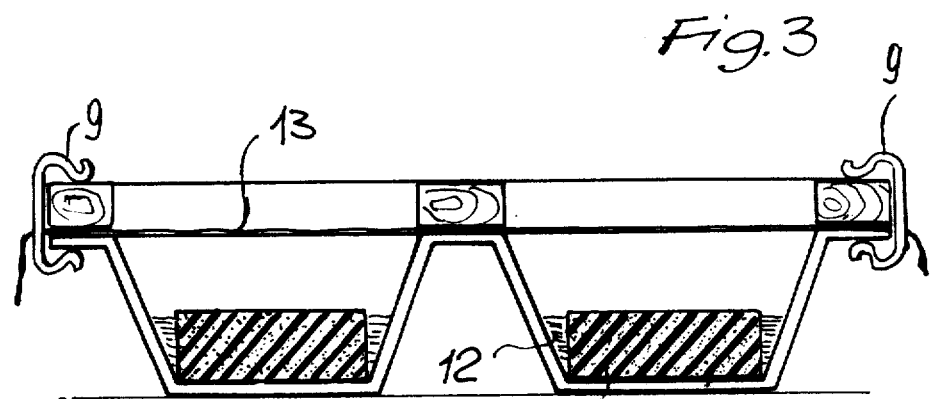
Fig. 3
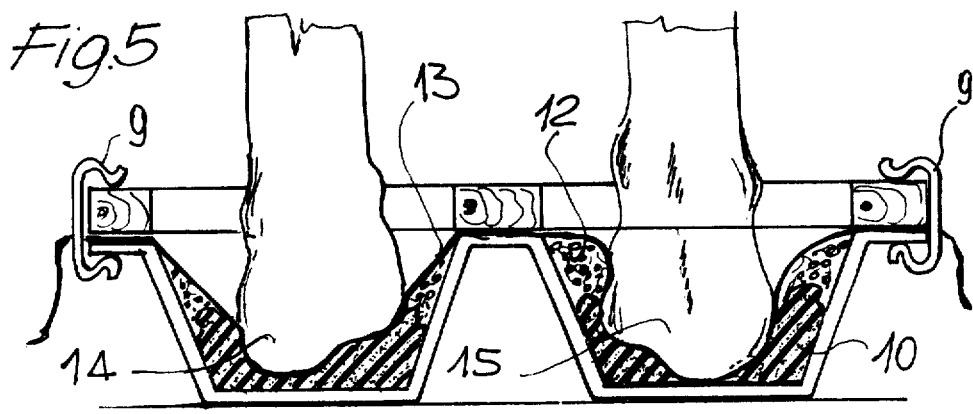
Fig. 4
Fig. 5

METHOD AND APPARATUS FOR MANUFACTURING FOOT SUPPORTS WITH ANATOMICALLY CONTOURED SHANK PORTIONS

BACKGROUND OF THE INVENTION

This invention relates to a method and apparatus for manufacturing foot supports such as insoles and the like with an anatomically configured surface corresponding to the bottom of a user's foot.

Footwear articles, which are currently produced with mass production techniques, are designed to fit an average human foot, such that they can be conveniently utilized by a large number of users.

However, the shape of human feet differ between individuals, and for this reason adaptation plantar shanks are generally employed which are selected by trying their fit with the worn footwear.

The currently available shoe shanks of this type come in a very large variety of designs and in large number, their differences residing in their shapes, thickness, material, and the reference anatomy after which they have been modelled.

Accordingly, the problem of adaptability has been merely mitigated, or rather transferred to another product.

In recent times, so-called self-modelling shanks have been introduced (e.g. comprising a flexible bag filled with water), which on deforming under the body's weight, acquire the contours of the foot sole.

However, their functionality is rather poor, inasmuch as by utilizing the principle of displacing a material from the more heavily loaded areas toward the lightly loaded ones, they cannot always adapt themselves because their operation is only suitable for feet having an exactly determined free volume (plantar arc and space between toes and sole).

SUMMARY OF THE INVENTION

This invention sets out to provide a method which allows shoe shank portions to be manufactured in a simple manner, the shape whereof exactly fits the foot of its intended user.

Within that general aim, it can be arranged that the invention also provides an apparatus of very simple configuration for implementing said method.

It can be further arranged that the method and apparatus according to this invention are quite economical, such that high quality and low competitive price products can be obtained.

According to one aspect of this invention, there is provided a method of manufacturing insoles with anatomically contoured shank portions, characterized in that it comprises the steps of:

(a) arranging on the bottom of a pair of side-by-side pans a strip of a fiber reinforced spongeous material for each pan, said material being deformable under load;

(b) pouring into said pair of pans a reactive chemical composition effective to impregnate said fibrous-spongeous material and then foam within a sufficiently short time;

(c) covering said pair of pans with an impermeabilized cloth of the elastic type held stretched by a suitable frame;

(d) positioning the user's feet on said cloth in said pans such as to deform both said cloth and said spongeous material according to said user's foot configuration;

(e) allowing the chemical composition to set for a sufficient time to retain unaltered the impression thus left in said material; and (f) removing the blanks thus obtained and trimming them to just leave the plantar impression and cut the insole to the footwear contour wherefor the insole is intended.

The term insole as used herein should be intended in the sense that it may comprise only the shank portion to be inserted into the shoe. The term spongeous or spongy material is inteded to indicate an elastic, porous and absorbent material.

BRIEF DESCRIPTION OF THE DRAWINGS

Further features and advantages of the invention will be more clearly apparent from the following detailed description of the method steps and implementing apparatus provided for the inventive method, said steps and apparatus being illustrated by way of example only in the accompanying drawings, where:

FIG. 3 illustrates the step of pouring the reactive composition into the pans;

FIG. 4 shows the arrangement of the cloth over the reaction area;

FIG. 5 illustrates the molding step using the intended wearer feet as plugs;

DESCRIPTION OF THE PREFERRED EMBODIMENTS

Figure 1:
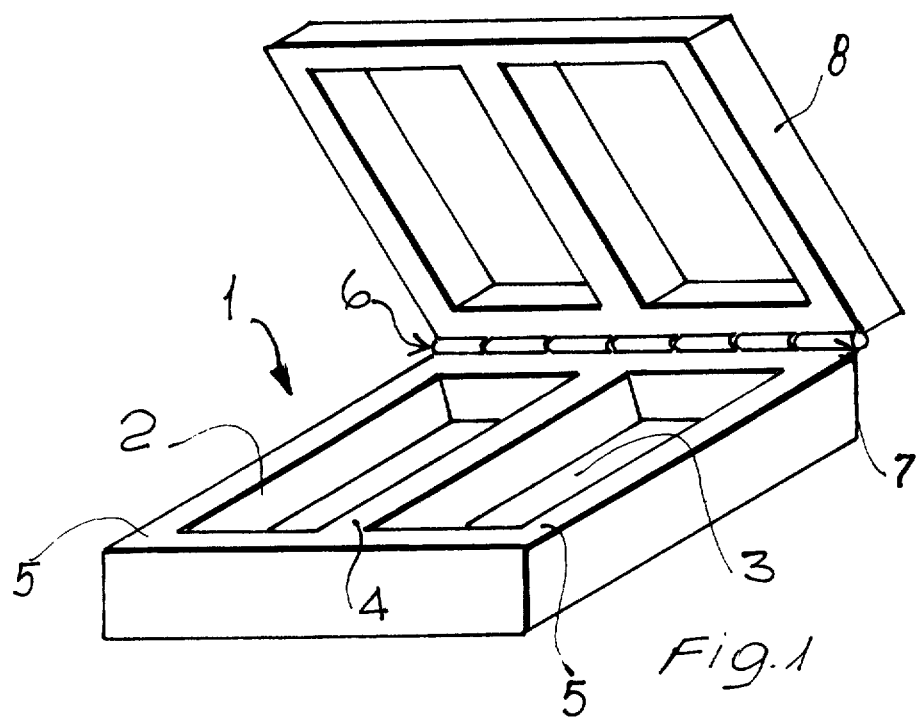
FIG. 1 is a perspective view of the dual pan container wherein the insoles with shank portions are molded.
Figure 2:
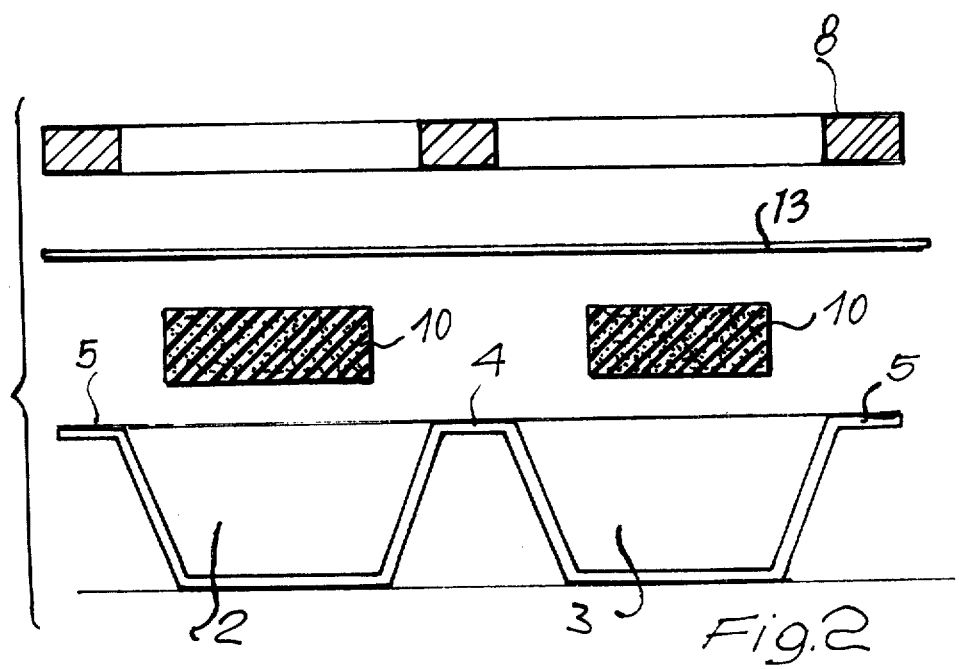
FIG. 2 is a sectional view of the assembly involved in the method.
Figure 6:
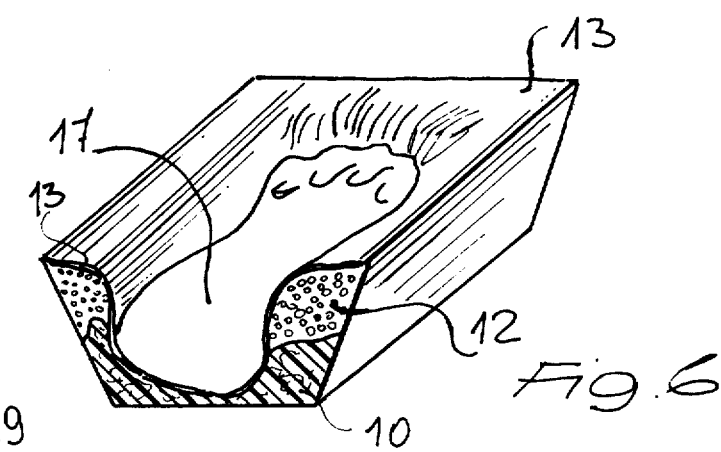
FIG. 6 shows the blanks as withdrawn from the molding pans.

With reference to the drawing figures, in a box-like container 1 of substantially parallelepipedal shape, preferably molded from a plastics material, there are two trough-like shaped pans 2, 3 which are arranged side-by-side surrounded by side-walls and separated by a raised web 4 or intermediate side-wall extending to the same height as the contour 5 of said box-like container 1. Said pans 2 and 3 have such dimensions as to amply accommodate the user's feet.

Along an upper edge indicated at 6, there is provided a hinge 7 which holds a lid-like frame 8 securely, the frame 8, in its closed position, overlapping the upper edge of the box-like container 1 and having openings to leave the top faces of the pans 2 and 3 open.

In the closed position, said frame 8 is held in contact with the upper edge of the container 1, by means of manually operated latches 9.

The first step of the method according to this invention consists of preparing parallelepiped strips or pads 10 from a spongeous material preferably of polyester material which is highly deformable under load, and of arranging such elements on the bottom of the two pans. If desired the spongeous material may be reinforced with fibers. Then, a reactive product or composition 12 such as a two-component polyurethane is prepared in any suitable preparation vessel 11 and poured to impregnate the spongy material 10 and foam and solidify in a prearranged convenient time.

After pouring said reactive composition, both pans, 2 and 3, are covered with an elastic or under certain circumstances preferably bi-elastic or two-way elastically stretchable type of impermeabilized cloth 13, which is held in place by lowering the frame 8.

At this time, the intended user puts his/her feet 14 and 15 into the pans, thus deforming the spongeous material 10 which will be molded to an exact impression of the feet.

The feet 14 and 15 should be kept fixed in position until the product 12 has reacted completely, thus producing a block 16 carrying an impression 17 of considerable solidity and indeformability.

Figure 7:
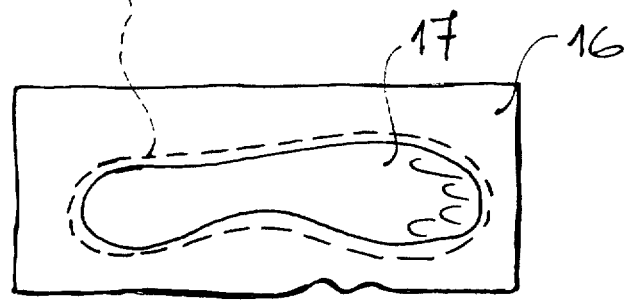
FIG. 7 is a plan view of the blanks evidencing the trimming lines for the finishing step thereof.
Figure 8:
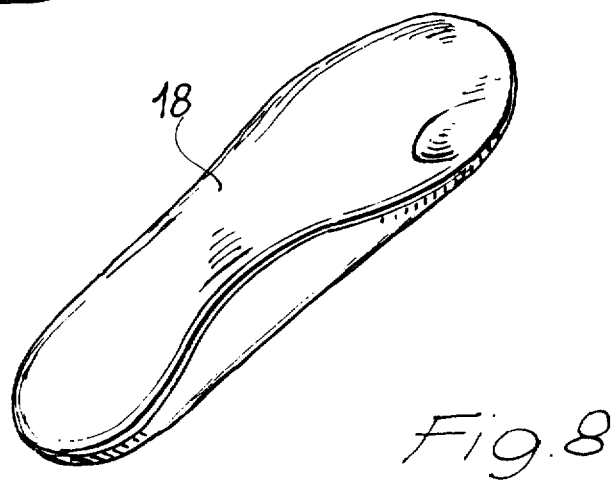
FIG. 8 shows the finished product.

To obtain the finished product 18, that is the insole or shank portion, the block 16 is cut, at first in a coarse manner along a line like at 19 in FIG. 7, thereafter it is trimmed with conventional equipment such as to closely adapt it to the shape of the footwear for which it is intended.

The elastic cloth 13 may either become part of the product or alternatively, if desired, stripped off the product.

The resulting product is an insole or shank portion which precisely fits the foot of the person that underwent the molding process, and the supporting of the plantar region of the foot is a uniform one without overpressure or unsupported areas.

The method and apparatus implementing it are extremely simple, involve no excessive equipment and material costs, and its use is well within the capabilities of almost anyone.

The quality level of the resulting product is quite good, and its cost fairly limited.

No problems of excessive metering are encountered because any excess material would simply bulge out the elastic cloth at the foot sides, and after solidification be eliminated with a trimming operation.

It will be appreciated that all of the invention objects are achieved, by providing a simple and practical method of preparing insoles with anatomically contoured shank portions taylored to fit, thus solving a large number of the problems which arise from the different configurations of the feet of each individual.

Obviously, the dimensions and materials may be any ones, as dictated by individual application requirements.

I claim:

1. A method of manufacturing foot supports such as insoles and the like with an anatomically configurated surface corresponding to the bottom of user's foot, comprising the steps of:

arranging on a supporting surface at least one pad of spongy material, impregnating said pad with a foamable hardenable reactive chemical composition, positioning the user's foot onto the impregnated pad and causing the impression of the user's foot to be formed onto said impregnated pad, leaving the user's foot in position onto said pad until the reactive chemical composition has attained a sufficient degree of hardness to maintain the impression unaltered, removing the foot thereafter from the pad and cutting and trimming the impressed and hardened pad to obtain a foot support therefrom with desired contour.

2. A method of claim 1, including the step of putting an impermeabilized cloth above said pad after the impregnation step with the reactive chemical composition and before the positioning of the foot thereon.

3. A method of claim 1, wherein two pads are arranged side by side on the supporting surface and wherein the impregnation step comprises pouring the reactive chemical composition onto said pads and preventing the poured composition to drain away by arranging the supporting surface to coincide with the bottom of a pair of side by side trough shaped pans thereby to flood at least partially said pads with the chemical composition and including the step of putting an impermeabilized cloth above said pads after the impregnation step and before the positioning of the feet on the pads.

4. An apparatus for manufacturing foot supports with an anatomically configurated surface corresponding to the bottom of a user's foot, comprising a container, a pair of pan formations formed therein in side by side relationship to each other and having each a bottom surface and sidewalls extending upwardly from the bottom surface thereby to define a trough-like shape for each pan, one of said side walls being arranged in an intermediate position between said pan formations and separating said pan formations from each other, said pans being adapted to hold a spongy pad on each of said bottom surfaces, said sidewalls having a contour zone on the top thereof, hinge means on an edge of said contour zone, a lid-like frame hinged on said hinge means and in closed position mating with said contour zone, opening in said lid-like frame situated above said pan formations when the lid-like frame is in closed position to allow a user's feet to pass therethrough and reach the pads on said bottom surfaces.

5. An apparatus according to claim 4, further comprising latch means for holding said lid-like frame in closed position onto said container.

* * * * *